Nov. 27, 1956 J. MIHALYI 2,771,813
APPARATUS FOR CONTINUOUS MOTION PICTURE PROJECTION
Filed Sept. 5, 1952 4 Sheets-Sheet 1
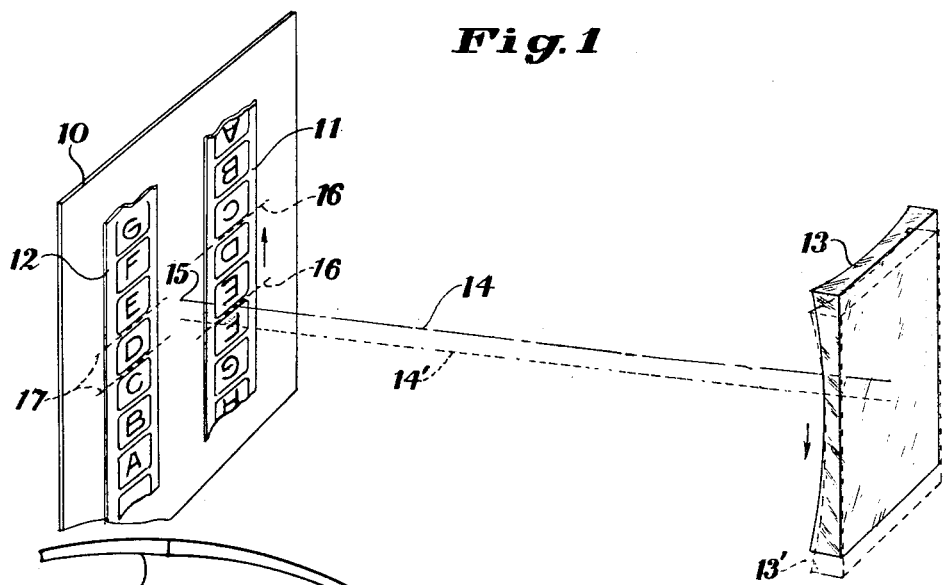
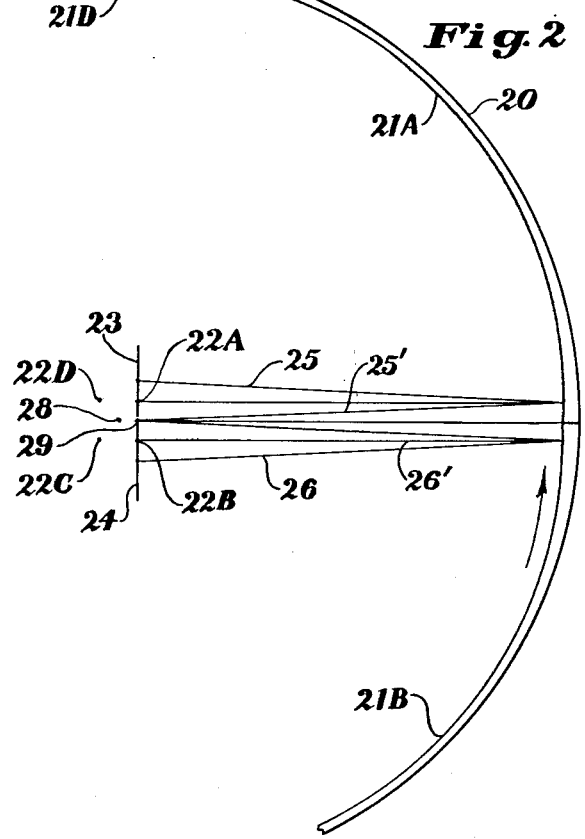
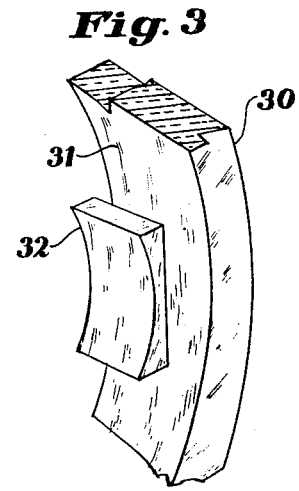
Joseph Mihalyi
INVENTOR.

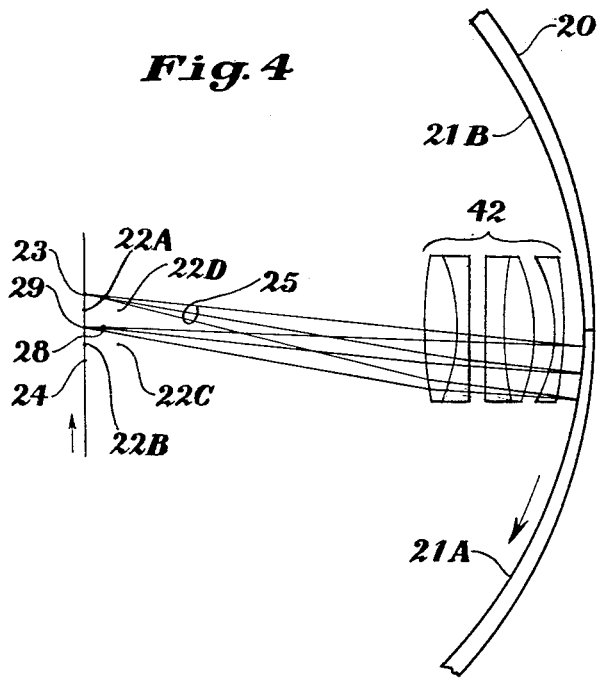
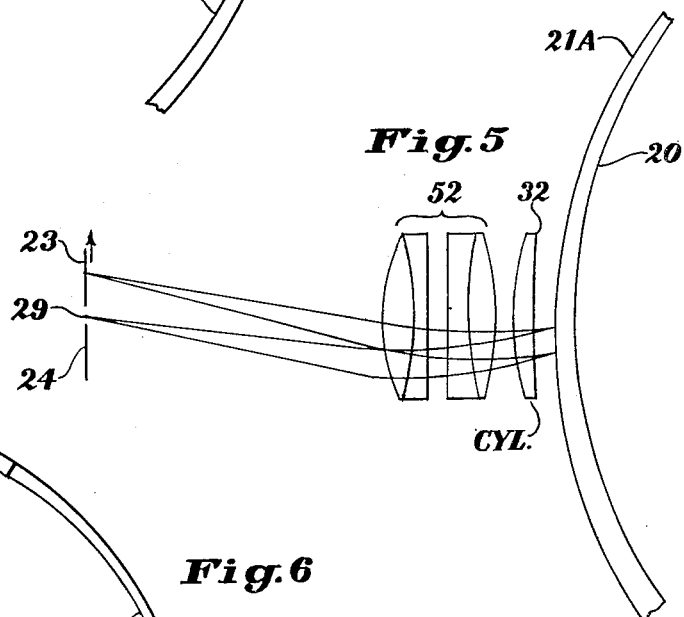
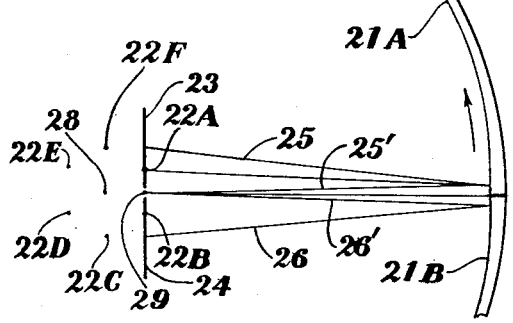

Nov. 27, 1956    J. MIHALYI    2,771,813
APPARATUS FOR CONTINUOUS MOTION PICTURE PROJECTION
Filed Sept. 5, 1952    4 Sheets-Sheet 3
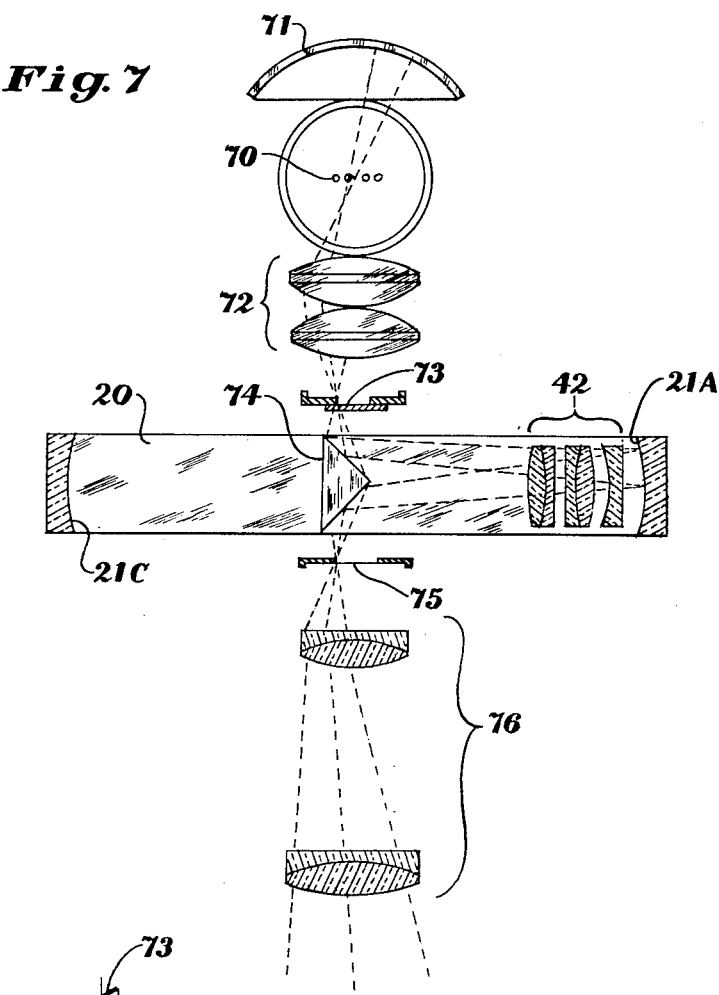
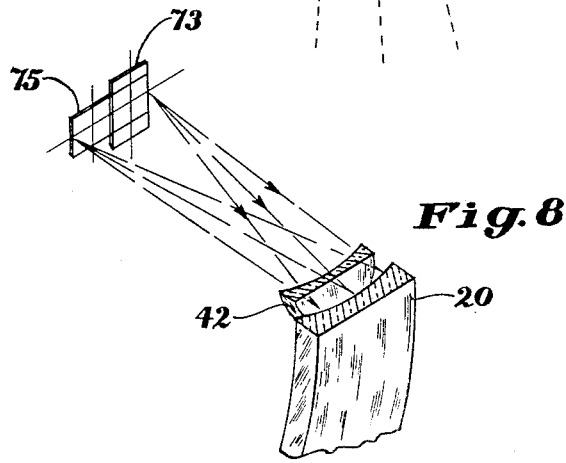
Joseph Mihalyi
INVENTOR.
BY
ATTY. & AGT.

Nov. 27, 1956  J. MIHALYI  2,771,813
APPARATUS FOR CONTINUOUS MOTION PICTURE PROJECTION
Filed Sept. 5, 1952  4 Sheets-Sheet 4

Joseph Mihalyi
INVENTOR.
BY Daniel D. Mayne,
Harold F. Bennett
ATTY. & AGT.

United States Patent Office 2,771,813
Patented Nov. 27, 1956

2,771,813
APPARATUS FOR CONTINUOUS MOTION PICTURE PROJECTION

Joseph Mihalyi, Rochester, N. Y., assignor to Eastman Kodak Company, Rochester, N. Y., a corporation of New Jersey Application September 5, 1952, Serial No. 308,008

1 Claim. (Cl. 88—16.8)

This invention relates to motion picture projection from continuously moving film.

The object of the invention is to provide a motion picture projector having only a very few moving parts and projecting from continuously moving film whereby the screen is illuminated continuously.

A particular object of the invention is to provide a motion picture apparatus suitable for broadcasting motion pictures by television.

An ancillary object of the invention is to provide a continuous motion picture projector in which the changeover from one film frame to the next is accomplished without any perceptible darkening of the screen either locally or generally.

A great many attempts have been made to project motion pictures from continuously moving film. Such a system has two principle advantages, namely, that the continuous movement of the film eliminates the wear and tear on the sprocket holes caused by the ordinary pulldown claw and second that the screen would be continuously illuminated thus eliminating flicker and raising the average illumination of the screen. Some of the proposed systems have been almost fantastic in their proposals for mounting half a dozen or more prefectly matched projection lenses on an endless chain and propelling them at a uniform speed around a circular path flattened slightly on one side of the circle. Other systems have proposed a warped or twisted reflecting surface such as a modified toric surface lying along a helical or spiral curve rather than along a circle or a surface which departs from a plane or cylindrical surface by being twisted so that it tilts to the right at one end of the useful area and to the left at the other end. Such surfaces are impossible to make by ordinary optical polishing methods and introduce skew aberrations into the image-forming pencils of rays. Only spherical, toric or cylindrical mirrors are used in the present invention and they are never oblique but always arranged with a plane of symmetry parallel to the effective direction of motion of the film. Still other systems propose a reciprocating mirror which moves or tilts in one direction gradually to compensate for the movement of one frame of the motion picture film and which is supposed to be instantly restored to its initial position to pick up the next frame of the film. Experience has shown, however, that even in ordinary motion picture viewing restoring the mirror in two one-thousandths of a second is not quick enough to eliminate blurring. No system heretofore proposed has enjoyed any considerable commercial success except for one German machine of which about a thousand were made a few years ago and which required such precise workmanship as to make the cost of manufacture prohibitive under the present conditions. Some systems which would perhaps be practical for ordinary motion picture projection are not suitable for television transmission because, during the changeover from one frame to the next, a narrow, dark band sweeps across the screen. While such a shadow is not perceptible in ordinary viewing, television projection is done by a process of scanning and the scanning spot would pass over this dark band in one part of the picture area during one changeover and in another part during another changeover, and, due to the fact that the standard rate of movie projection is 24 frames per second and the standard rate of scanning for television projection is 60 frames per second, this would cause flickering dark spots in certain parts of the film of the image area or other stroboscopic effects.

According to one embodiment of the present invention, light from a film gate is projected onto the generally cylindrical exterior or preferably interior surface of a ring of mirrors whence it is reflected back and focused at unit magnification in an image gate which is positioned to one side of the film gate and optionally the image so formed is relayed and projected onto the viewing screen by a projection lens of standard type. When the interior surface of the ring of mirrors is used for the above-described reflection the light illuminating the film gate is fed into the ring of mirrors through one end face of the ring and the light from the image gate proceeding to the projection lens comes out of the opposite end face, and diagonal mirrors are used in each case to redirect the light to or from the interior cylindrical face of the mirror ring. Besides the diagonal mirrors (which may be arranged to intercept the light either before or after the light passes through the respective gates) one or more lenses at a fixed position may be used in conjunction with the mirror ring and the lenses may be arranged individually by the two gates or may be arranged so that light from the film gate passes through the lens on the way to the mirror and back through the same lens on the way to the image gate, or some lenses of each kind may be used. In any case the film gate and image gate as viewed from the position of the mirror surface of the mirror ring appear to be side by side and at equal distances from the mirror surface. The specific construction of the mirror ring will be understood more readily if it is pointed out at the present juncture that the ring is rotated around its major axis in order to compensate for the motion of the motion picture film passing through the film gate. The mirror ring is made up of a number of sections, and for definiteness the number of sections will be designated as N; thus each mirror section subtends an angle of $$\frac{360°}{N}$$

at the center of the ring and correspondingly N frames of motion picture film are to be fed through the film gate during each revolution of the ring. The radius of curvature of each mirror section in the plane of the circumference of the ring is substantially equal to the apparent distance of the object and image gates, that is, the effective object located slightly to one side of the center of curvature of the mirror is imaged at least virtually at the apparent position of the image gate slightly to the other side of the center of curvature of the mirror section. The axis of rotation of the whole ring is displaced in front of or behind the apparent position of the gates by a distance X such that the center of curvature of the mirror section moves at one-half the rate of advance of the motion picture film while in the operative position. It will be clear that in the embodiments in which the axis of rotation is behind the apparent position of the film gates the part of the mirror ring which is reflecting light at any particular time is moving in the same direction as the film advance whereas in the other embodiment when the axis of rotation is between the gates and the effective part of the mirror ring the ring rotates in the opposite direction. The distance which the center of curvature of each mirror sector must be from the axis of rotation is designated as X and must be according to the following formula for the proper operation of the projector:

$$X = \frac{LM}{2 \sin} \frac{180°}{N}$$

where L is the distance from the center point in one film frame to the corresponding point in the next and M is the magnification due to the part of the optical system other than the revolving ring mirror; that is, LM is the apparent distance from a point in one film frame to the same point in the next as viewed from the mirror position.

It is generally preferable that each sector of the mirror ring be a portion of a sphere, that is it has the same curvature in both directions. However, this is not an essential feature of the invention and the mirror optionally is given different curvatures in the direction along the periphery of the ring and in the direction transverse thereto and the astigmatic power due to this difference is then substantially neutralized in accordance with the well-known rules of opthalmic optics by a fixed cylindrical or toric lens. In the form of the invention in which the outside surface of the mirror ring is the reflecting surface, the lens part of the optical system receives light from the film gate and projects a virtual image thereof to a plane behind the reflecting surface and at a distance X in front of or behind the center of the mirror ring. While the concave mirror ring, that is, the inside reflecting mirror ring, is preferable from an optical point of view, the exterior reflecting ring has certain practical advantages in that the mechanism for rotating the ring is completely out of the way of the film advance and projection apparatus.

In the accompanying drawings:

Figure 1 is a diagrammatic perspective drawing showing the basic principles of the means for optically compensating for film movement according to the present invention.

Figure 2 is an optical diagram showing the rectifying system of the continuous projector according to the invention in its simplest form.

Figure 3 is a drawing of a part of the system of Figure 2 modified in that cylindrical mirrors are used in the mirror ring.

Figure 4 shows a different form of the invention in which the axis of rotation is between each mirror and its center of curvature.

Figure 5 is a partial view of another form of the invention in which the reflecting surface is on the exterior of the mirror ring.

Figure 6 is a diagram of another form of the invention having a different number of sectors in the ring.

Figure 7 is a diagrammatic plan view partly in section of the complete optical system of a projector according to the invention.

Figure 8 is a perspective diagram showing the comparative size of the film gate and image gate.

Figure 9:
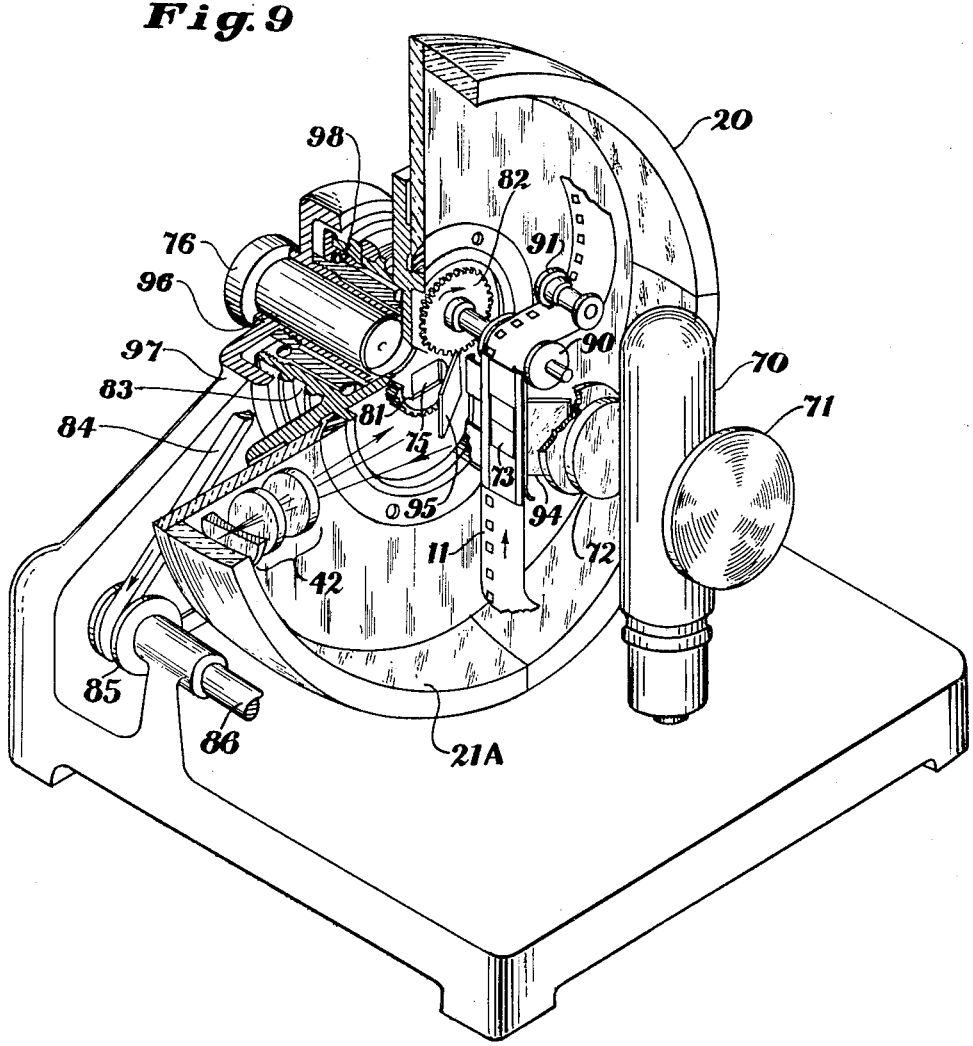
Figure 9 is a perspective view partly cut away of a projector corresponding, except for minor details, to the showing of Figure 7.

Fig. 1 is a diagrammatic perspective drawing showing the basic principles of the means for optically compensating for film movement according to the present invention. A motion-picture film 11 located in a plane 10 is imaged in the same plane by a concave mirror 13, the image 12 lying alongside the film 11 and of course inverted with respect thereto. In the position shown, the axis 14 intersects the plane 10 at a point 15 midway between the center point of each frame and its image. In practice, a film gate is provided with an aperture great enough to expose two frames of the film and an image gate is provided which fits one frame of the film. For definiteness, we consider the frames D and E of the film to be in the film gate as shown and frame D of the image to be in the image gate, the two gates being indicated by broken lines 16 and 17. The frame D is imaged into the image gate when the mirror 13 is in the position shown by full lines in Fig. 1. Now if the mirror 13 could be instantly shifted to the position 13' and the axis 14 to the position 14' (shown in dotted lines), the other film frame E exposed in the gate would then be imaged into the image gate now occupied by image D. After this shift, the mirror 13' should be moved upward at one-half the rate of motion of the film 11 so that the image of the frame E would then be maintained in a steady position in the image gate shown occupied by image frame D. This would be an ideal type of continuous projector in which the image gate would be illuminated at all times and no shutter would be required were it not for the fact that it is impossible to move the mirror instantaneously. The present invention provides a way of overcoming this difficulty by moving mirror 13 out of the optical beam and moving another mirror into the beam during a finite period of time known as the change-over time or the dissolve time during which time the image of frame D fades out of the image gate and the image of frame E superimposed thereupon comes in.

Fig. 2 is an optical diagram showing the rectifying system of a continuous projector according to the invention in its simplest form. A circular ring 20 is made up of spherical mirrors 21A, 21B, 21C (not shown) and 21D with their reflecting surfaces facing the inside of the ring. These mirrors are not concentric with the ring 20 but have centers at points 22A, -B, -C, and -D respectively. The ring itself is shown thinner than would be made in actual practice so as to accentuate the eccentricity. As shown, the mirror 21A is passing out of the optical beam and mirror 21B is coming in. A ray of light 25 from the center point in film frame 23 is reflected at mirror 21A and returns by path 25' to the corresponding point 29 of the image frame. A similar ray 26 from the corresponding point of the incoming film frame 24 is reflected at mirror 21B and proceeds by path 26' to the same point 29 of the image frame. It is understood, of course, that point 29 is displaced out of the plane of the diagram in one direction and film frames 23 and 24 are displaced in the opposite direction. The whole mirror ring 20 rotates around its center 28 in synchronism with the film movement so that a mirror sector 21B advances to the position now held by mirror 21A (and, of course, its center of curvature 22B advances to the point 22A) at the same time that film frame 24 advances to the position now held by frame 23, thus compensating for the movement of the film and making the image point 29 stand still.

Fig. 3 shows an arrangement whereby cylindrical mirrors are used in the mirror ring 20. A cylindrical lens 32 is mounted inside the ring and intercepts the optical beam. This cylindrical lens is preferably given exactly the cylindrical power to compensate or counterbalance the power of the cylindrical mirror 31 so that the net effect, so far as focusing power is concerned, is the effect of the tilting of a plane mirror and the focusing power is to be supplied by a group of lenses in a fixed position in the optical beam. According to a variation of this form of the invention, a cylindrical lens of positive power in the transverse plane combines with the cylindrical mirror to provide the same dioptric power in both directions.

Fig. 4 shows a slightly different form of the invention differing from Fig. 2 in that each mirror sector is thicker at the center than at the ends rather than thinner as in Fig. 2. Two sectors 21A and 21B are partially shown having their centers of curvature 22A and 22B beyond the center of curvature 28 of the ring 20 rather than on the near side of this center as in Fig. 2. Another feature (independent of the feature just mentioned but also shown in Fig. 4) is that a lens system 42 is mounted in a fixed position in the optical beam for correcting the aberrations of the spherical mirror 21A or 21B but having very little dioptric power. It is understood, of course, that two other sectors of the mirror ring are provided having centers of curvature at 22C and 22D. The operation is the reverse of that of Fig. 2 in respect to the direction of rotation of the mirrors. Rays of light 25 coming from the center point in the film frame 23 which occupies the upper half of the film gate proceed through the lens 42 and cross the axis and strike the mirror 21A from whence they are reflected back through the lens 42 and come to a focus at the midpoint 29 of the image frame. Similarly, rays of light (not shown) coming from the corresponding point in film frame 24 traverse lens 42 and are reflected from mirror sector 21B back through the lens to focus at the same image point 29. Again, as in Fig. 2, the image point 29 is displaced out of the plane of the diagram in one direction and the film gate is displaced in the other direction. As the mirror ring rotates downward through the optical beam, less and less of the light originating from film frame 23 strikes mirror 21A and more and more light from frame 24 strikes mirror 21B until the change-over is completed at the point when mirror 21A is completely out of the optical beam, at which time the image of frame 24 has replaced the image of frame 23 in the image gate. After the change-over film frame 24 continues upward through the film gate and simultaneously the center of curvature 22B moves upward to the position now held by the center of curvature 22A, at which time the change-over to the next succeeding frame will be half completed. It will be evident that lenses such as lenses 42 can be used in combination with the mirror ring of Fig. 2 to correct the aberrations thereof in the same way as in Fig. 4. The system shown in Fig. 4, however, has the slight practical advantage that the light beam crosses the axis in front of the mirror and that accordingly the aperture stop can be placed in the lens system rather than at the mirror. Stated in another way, the light beam goes through the lens more centrally than would be the case if the mirrors were thicker at the ends of the sectors as in Fig. 2.

Fig. 5 shows still another variation in which the mirror ring 20 has reflecting surfaces on the outside of the ring. In this case, it is preferable to make the ring a cylindrical mirror and to compensate for its cylindrical power by a convex cylindrical lens 32 so that the dioptric power of the system is concentrated in the lens 52 which is mounted in a fixed position between the mirror ring and the film. Here again there are two almost equivalent arrangements according to whether each sector of the mirror ring is thicker at its center or at its ends. As in Figs. 2 and 4, the film frame 23 is imaged in the image gate and while the mirror sector 21A moves out of the optical beam and the next sector (not shown) comes in, the next film frame 24 will be imaged in the image gate. The advantage of the construction indicated in Fig. 5 is that the rotating mirror ring is entirely on the other side of the lens system where it does not interfere in any way with the action of the film feed or with the illumination system of the projector.

Fig. 6 shows a different variation of the invention according to which the mirror ring 20 is made up of six sectors, of which three, 21A, 21B, and 21F are shown at least partially. The six sectors have centers of curvature at 22A, -B, -C, -D, -E and -F respectively. The optical action corresponds to that of Fig. 2 in that the frame 23 is imaged at the image gate represented by point 29 until mirror 21A passes out of the optical beam and the next succeeding frame 24 is imaged in register therewith while mirror 21B is coming into the beam. This system differs but slightly from that of Fig. 2. The differences are chiefly that the mirror ring 20 rotates once for every six movie frames rather than once for every four and that the change-over time is a slightly larger percentage of the total time of exposure of each frame.

Obviously, the mirror ring can be made up with any number of mirror sectors from four to about fifty. At about this number the aperture limitations become too strict. Also, the difficulties of alignment increase with an increased number of sectors. Of course also, any of these systems that are diagrammed without a fixed lens between the mirror and the gate can be and preferably are used with such a fixed lens. Moreover, it is to be understood that the lens may focus the gates beyond or in front of the center of the ring, in which case the film frames 23, 24 of the previous diagrams correspond not to the actual film gate but to the virtual image of the film gate or the apparent position thereof as viewed from the mirror.

Fig. 7 is a diagrammatic plan view partly in section of the optical system only of a projector according to the invention. A light source 70 reinforced by a spherical mirror 71 is provided and the light therefrom is concentrated by a condenser system 72 upon the film gate 73. The light proceeds through the film gate 73 and strikes a 45-degree reflector which is conveniently one of the legs of a right-angle prism 74 located at substantially the center of the mirror ring 20. The light is reflected in the 45-degree reflector and passes through the lens system 42 to the mirror face 21A. The lens has just enough dioptic power to make the light coming from the film gate diverge as if it were coming from a point in the plane of the center of curvature of the mirror 21A. The mirror reflects the light back through the lens to the other roof face of the right-angle prism 74 where it is reflected out in the general direction of the axis of the mirror ring to the image gate 75. Although it is possible to view the image in the image gate 75, it is very inconvenient to do so and it is preferable to provide a projection lens 76 of standard type for relaying the image to a viewing screen at a greatly magnified size. It will be noted that the reflecting lens system inverts the image of the film and the projection system 76 inverts it again and hence that the film runs through the film gate in the reverse direction from the standard practice; that is, it runs up rather than down.

Fig. 8 is a perspective drawing showing the film gate 73 and the image gate 74 side by side, the film gate being twice as high as the image gate.

Fig. 9 is a view in perspective partly cut away of a projector according to the invention corresponding to Fig. 7 except for the one detail that the film gate is inside the mirror ring and is traversed by the light after reflection rather than before. This is done so that the film drive can be more conveniently geared to the mirror ring rotor. The illuminating system 70, 71, 72, corresponds to that of Fig. 7 and throws light on to diagonal reflector 94 where it is reflected into the film gate aperture 73 through which the film 11 is drawn upward by the sprocket wheel 90. After leaving the sprocket wheel 90, the film rolls over the idler 91. The rest of the rollers and the reels used for feeding the film into and out of the interior of the mirror ring are omitted for simplicity, being well known in the art. After the light passes through the film gate aperture 73, it passes through the lens 42 and strikes the mirror surface 21A where it is reflected back through the lens in the manner described relative to the previous figures back to the diagonal reflector 95 which reflects the light into the image gate 75. The image gate and the projection lens 76 are located in a hollow shaft 96 which is attached to or integral with the base and frame 97 of the machine. An accurately made ball bearing is fitted on to the shaft and the mirror ring 20 is attached to the outer ring 98 thereof. A gear wheel 81 also attached to the outer ring of the bearing and shown partly broken away meshes with another gear wheel 82 on the film sprocket shaft for driving the film sprocket. Also on the outer ring of the ball bearing is a groove 83 which acts as a pulley for the belt 84 which is driven by any source of motive power, such as an electric motor, not shown, driving the shaft 86 and the pulley 85.

In practice I find it preferable to locate the film gate so that the plane of its apparent position as viewed from the reflecting surface of the mirror ring is closer to the center of the ring than to the reflecting surface itself but not more than fifty times as close.

The present invention is generic to certain features described in my copending application Serial No. 308,007, filed concurrently herewith.

I claim:

A continuous motion picture projector comprising a film gate, means for illuminating the film gate, means for advancing film steadily through the film gate, an optical system and an optical compensator for cooperatively forming a stationary image of the moving film, and a projection objective adapted to project a relay image of the stationary image, in which the optical compensator comprises a rotationally and bilaterally symmetrical ring of from four to eight mirrors and means for rotating the ring in synchronism with the film advance, in which the optical system is axially optically aligned with an equatorial diameter of the ring and is adapted to present an image of the film gate to a spot on the ring the apparent position of said image as viewed from the ring being closer to the center of the ring than to the circumference thereof and a little to one side of the equatorial plane containing said diameter, and in which the center of curvature of a mirror occupying said spot on the ring is approximately at the same distance as the image of the film gate and is substantially at a distance $$\frac{L'}{2 \sin \frac{180°}{N}}$$

from the center of the ring, where $L'$ is the apparent distance from the center of one frame of the film to the next and $N$ is the number of mirrors, whereby a stationary image of the moving film is formed at the other side of the equatorial plane.

References Cited in the file of this patent

UNITED STATES PATENTS

| | | |
|---|---|---|
| 1,156,596 | Hall | Oct. 12, 1915 |
| 1,401,345 | Mechau | Dec. 27, 1921 |
| 1,564,295 | Thorner | Dec. 8, 1925 |
| 1,575,133 | Steigman | Mar. 2, 1926 |
| 1,655,185 | Hatschek | Jan. 3, 1928 |

FOREIGN PATENTS

| | | |
|---|---|---|
| 92,042 | Austria | Apr. 10, 1923 |
| 230,152 | Great Britain | Mar. 2, 1925 |
| 319,284 | Great Britain | Sept. 18, 1929 |
| 156,016 | Austria | Apr. 25, 1939 |